June 28, 1932.   A. W. CLARKE ET AL   1,865,406
ARTICULATED CAR
Filed Nov. 1, 1930   3 Sheets-Sheet 1

INVENTORS
Allen W. Clarke
William Griffin
BY
ATTORNEY

June 28, 1932.  A. W. CLARKE ET AL  1,865,406
ARTICULATED CAR
Filed Nov. 1, 1930   3 Sheets-Sheet 2
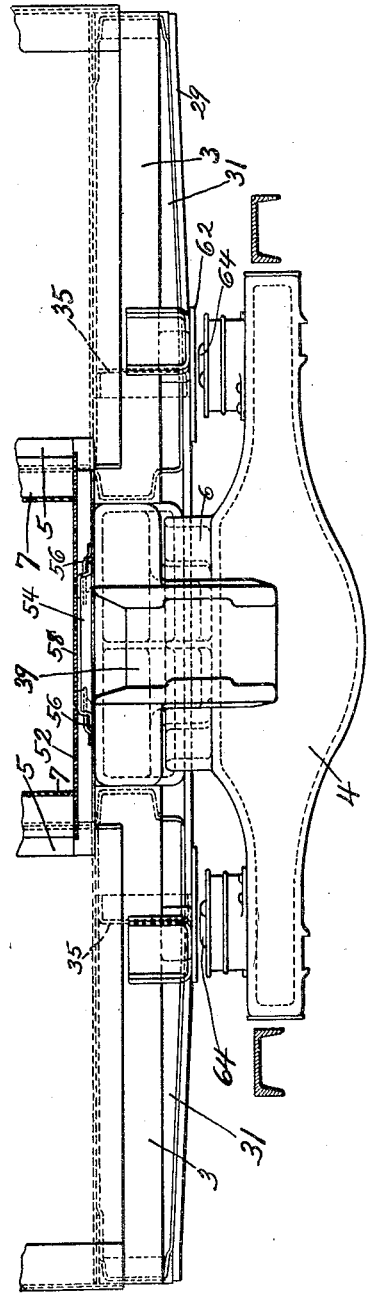
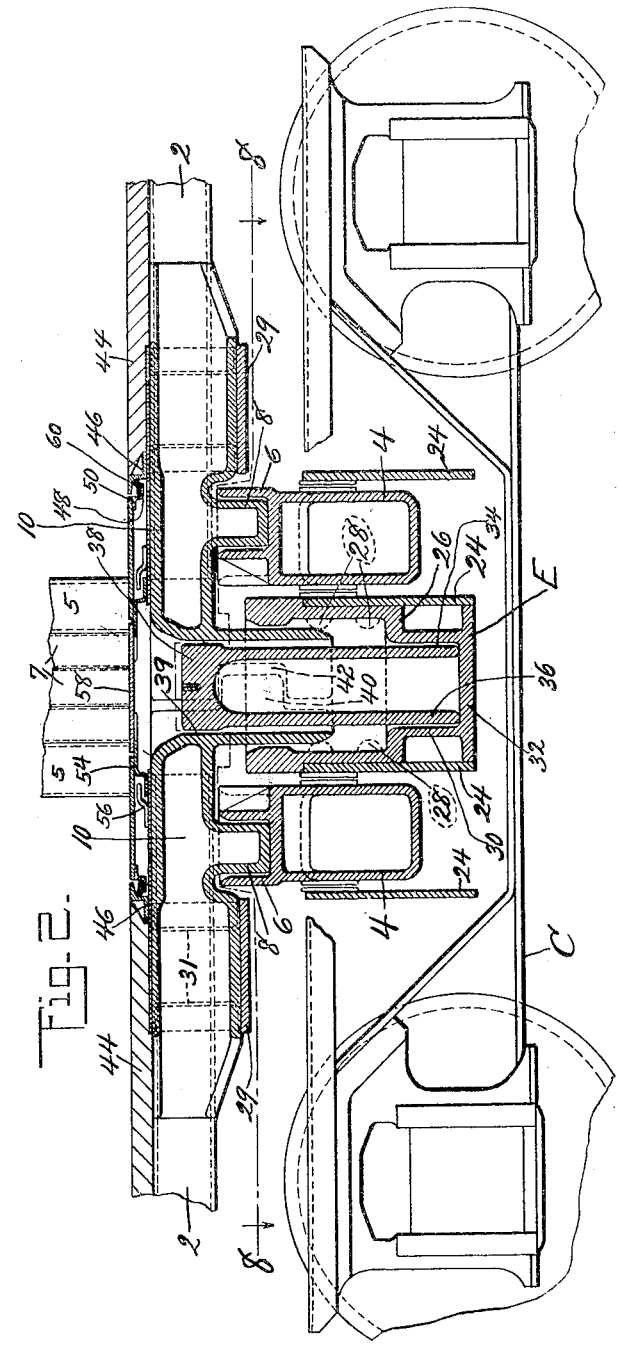
INVENTORS
Allen W. Clarke
William Griffin
BY F. H. Gibbs
ATTORNEY

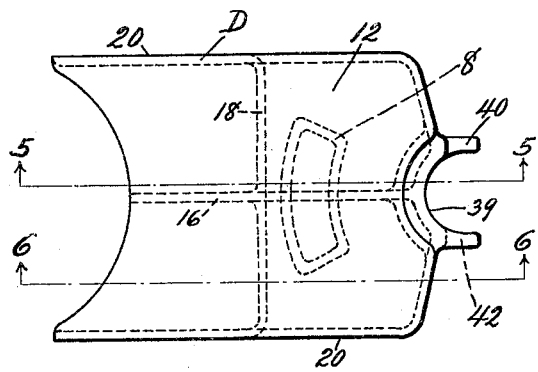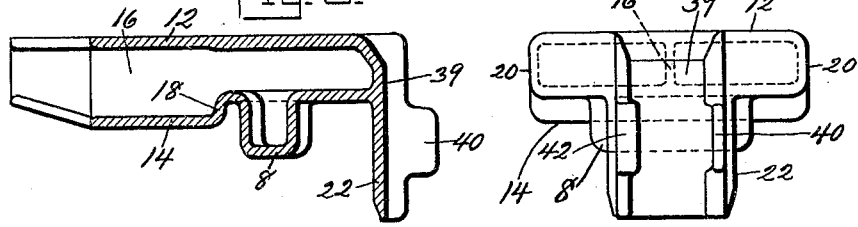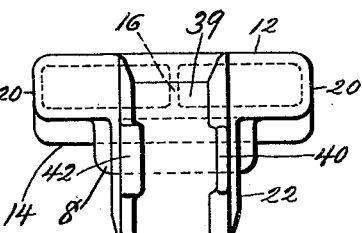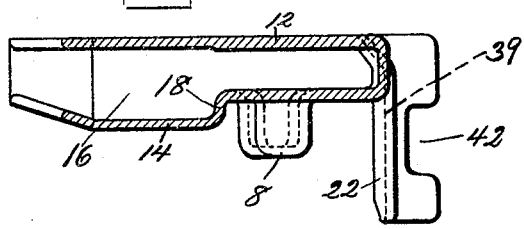

Patented June 28, 1932

1,865,406

UNITED STATES PATENT OFFICE

ALLEN W. CLARKE, OF RIDGEWOOD, AND WILLIAM GRIFFIN, OF RUTHERFORD, NEW JERSEY, ASSIGNORS TO AMERICAN CAR AND FOUNDRY COMPANY, OF NEW YORK, N. Y., A CORPORATION OF NEW JERSEY

ARTICULATED CAR

Application filed November 1, 1930. Serial No. 492,687.

This invention relates to articulated cars of the type in which the adjacent ends of two car bodies are supported by a single truck, the latter being known in the art as a pivot truck.

One object of the present invention is the provision of a connection for the adjacent ends of adjacent car bodies of an articulated car which will maintain these ends in their proper positions relative to each other and at the same time permit turning of the respective bodies due to the usual curvatures in tracks.

Another object of this invention is the provision of a connection for the adjacent ends of adjacent car bodies of an articulated car which includes a pivot truck provided with two spaced independent bolsters, each of which is adapted to support an end of a car body.

Still another object of this invention is the provision of an articulated car construction in which adjacent ends of adjacent car bodies are supported by a common truck provided with spaced bolsters, one each for supporting a car end; the construction also including an element interposed between the car ends and supported by the truck for preventing relative lateral shifting of the car bodies and for taking buffing shocks and transmitting the same from one car body to the other.

A further object of this invention is the provision of an articulated car having means associated with adjacent car ends for preventing relative vertical shifting of the car ends.

A still further object of this invention is the provision of means for preventing the separation of the adjacent ends of two bodies of an articulated car.

Another object of this invention is the provision of a new and improved body connecting casting for an articulated car.

The invention also contemplates a new and improved means for supporting the foot plate for an articulated car.

Other objects and advantages of this invention will be apparent from the following description taken in conjunction with the accompanying drawings in which:

Fig. 3 is a front view of one of the car ends showing the same mounted and supported by a truck bolster.

Fig. 4 is a top plan view of the body center casting.

Fig. 5 is a sectional view on the line 5—5 Fig. 4.

Fig. 6 is a sectional view on the line 6—6 Fig. 4, with certain parts omitted to more clearly disclose the structure of the body center casting.

Fig. 7 is a front view of the body center casting shown in Fig. 4, and

Fig. 8 is a sectional view on the line 8—8, Fig. 2.

Figure 1:
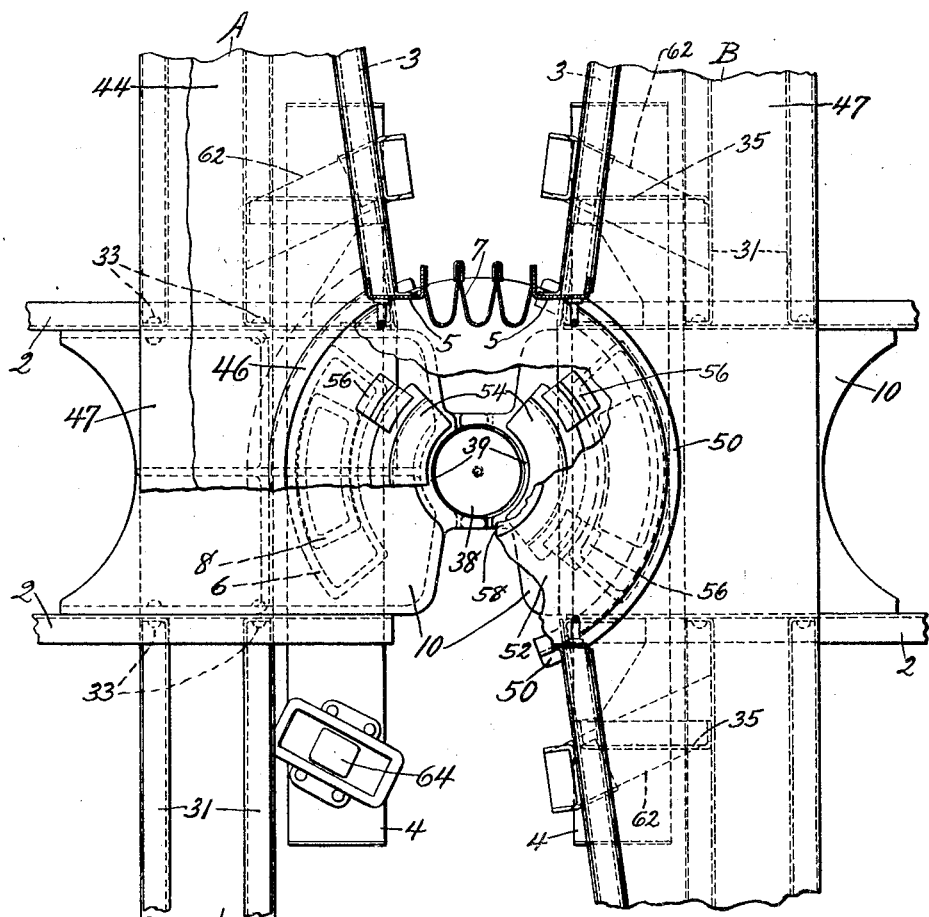
Fig. 1 is a top plan view of the end portions of adjacent cars, certain parts being broken away to more fully show the invention, other parts being shown in section, and other parts being omitted.

Referring now more particularly to the drawings in which similar characters of reference designate similar parts in the several views, in Fig. 1 the adjacent ends of two car bodies are shown, being designated A and B respectively, which car bodies are articulated together as presently to be described. The car bodies A and B may be of any preferred or desired general construction but include of course end sills indicated at 1 and 3 respectively and the cars also include center sills comprising spaced channels 2. The end sills, of course, may be formed of any desired construction.

The car bodies are provided with doorways in their ends to permit passengers to walk from one body to another, and the doorways are framed by U-shaped channels, portions of which provide door posts 5 and, in the instance shown, one flange of each of the posts extends beyond its car end to serve as an attaching means for a U-shaped diaphragm 7; the latter extending between the bodies A and B as clearly shown in Fig. 1 and defining a covered passageway between the adjacent car bodies.

The adjacent end portions of bodies A and B are supported by a common or pivot truck C having side frames of any preferred or desired construction, and said truck is provided with a pair of independent, spaced bolsters 4, one arranged beneath the end portion of each car body, and each of said bolsters is provided with a segmental member or plate 6 which plates receive the segmental bearings 8 formed on the lower surfaces of body connecting castings 10. The truck is provided with a plurality of spaced transoms 24, arranged in pairs; each bolster 4 being arranged between a pair of transoms.

The castings 10 as shown in Figs. 4 to 7, each comprises a body portion indicated generally at D having spaced top and bottom surfaces 12 and 14 respectively which are reinforced by longitudinal and transverse internal webs 16 and 18 respectively; the body portion also including side walls 20 adapted to fit against the webs of the channel center sills and to be secured thereto in any suitable manner as by riveting or welding. As an additional support for the castings 10, the underframe of each car body, at the adjacent end portions thereof is provided with an end crossbearer shown more clearly in Fig. 1 which comprises a bottom plate 29 extending between and connected to the side sills (not shown) on which the castings 10 rest as clearly shown in Fig. 2. The end crossbearers also include spaced diaphragms 31 which extend from the side sills of the underframe to the channels 2 of the center sills and are secured thereto in any suitable manner as by the rivets 33. For further reinforcing the end portions of the underframes, diaphragms 35 are provided which extend between one of the diaphragms 31 and the adjacent end sill; this construction being clearly indicated in Fig. 1. The connecting castings, as shown clearly in Fig. 1, extend beyond the ends of the car bodies and are provided with depending arcuate shaped or recessed projections 22 which extend into a member E arranged transversely of and carried by the truck and positioned intermediate the bolsters 4. In the present instance, the transverse member comprises the spaced transoms 24 between the bolsters, and a truck transom casting 26 secured to said transoms by rivets 28 or other suitable fasteners. The casting 26 is preferably hollow; the opening in the top thereof being circular to conform to the arcuate shape of the projections 22 and the lower end of the casting is reduced in diameter as at 30 to form, with the base 32 of said casting, a socket 34 which receives the lower end of a spacer pin 36. In the instance shown the pin is hollow but this is merely by way of example. The spacer is circular in form and is of a length to extend from between the projections 22 into the socket. The upper end of the spacer pin is thickened as at 38 and serves as a buffing element, being positioned between the adjacent castings 10, of which latter the surfaces 39 will contact with said thickened portion for buffing purposes.

In the construction thus described it will be apparent that the connection between the adjacent end portions of the car bodies includes a pivot which comprises the projections 22 in their engagement with the truck center casting 26. It will also be apparent that due to the engagement of the projections 22 with casting 26 the car bodies are restrained against excessive lateral or sidewise shifting. The spacer element or pin 36 obviously is a pivot pin and the projections 22, during pivotal movement in the casting 26, move around or relative to said pin 36 and the latter aids in preventing excessive relative sidewise shifting of the bodies.

Figure 2:
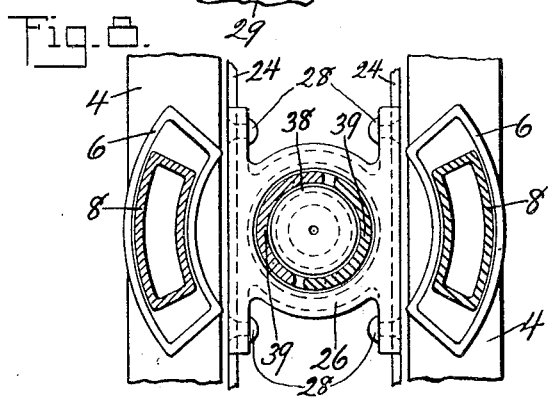
Fig. 2 is a sectional view through the articulation joint of the present invention, showing, more or less diagrammatically, a truck and also showing a portion of each of two adjacent car body ends.

The side edges of the projections 22 are provided respectively with a forwardly extending tongue 40 arranged on one side of the center line through the casting and a groove or recess 42 on the other side; the tongue 40 and groove 42 being vertically arranged as more clearly shown in Figs. 5 and 6. The castings 10 on adjacent car bodies are identical so it will be apparent that when the car bodies A and B are assembled as shown in Fig. 2 the tongue 40 of one casting will enter the groove 42 of its opposed casting and thereby provide a construction which will prevent relative vertical shifting between the adjacent car bodies A and B.

In the drawings the floors of the respective cars are indicated at 44 and they are each provided with nosing strips 46 of Z shape secured to end top cover plates 47, secured in any suitable manner to the castings 10. The upper flanges of the strips 46 face away from the floors 44 to provide spaces into which flange 48 of Z sections 50 extend; the Z sections 50 being substantially circular in form and being attached to the lower surface of a circular foot plate 52 which extends between the adjacent car bodies.

The foot plate 52 is supported by the adjacent end portions of adjacent car bodies A and B and has secured thereto brackets 54 which rest upon the ends of the body castings 10. For securing the foot plate against displacement, retaining clips 56 are provided, the same being secured to the castings 10 and overlap the brackets 54.

In order to disassemble the car bodies A and B from the truck it is necessary to remove the spacer pin 36. To effect this, the foot plate is provided with a removable portion 58 supported by the brackets 54. This portion 58 when removed permits access to the spacer pin 36. As clearly shown in Fig. 2, the Z section 50 serves also as an attaching means for a weather strip 60.

Secured to the end of each car body on opposite sides of the castings 10 are body side bearings 62 which are adapted to engage with truck side bearings 64 which latter, in the present instance, are shown as rollers but which of course may assume any preferred or desired form.

From the above description it is believed that the construction of the car of the present invention will be fully apparent to those skilled in the art. In operation, in passing around curves, the two car bodies A and B will swivel about the center of spacer pin 36 for the reason that the center of the pin is the center of the bearing surfaces of the two body connecting castings, and is also the center from which the arcs of the segmental shaped bearing plates of the respective car bodies are struck. Obviously it is necessary to provide sufficient clearance between working parts to compensate for variations in the track structure and to compensate for breaks in track grades and this has been done in designing the car of the present invention.

As each car body is supported by its own truck bolster, bearing plates and side bearings, each body may oscillate or sway independently of or relative to the other. At the same time the two bodies are prevented from relative vertical shifting due to the interengagement of the adjacent body connecting castings 10. This interengagement of the end or connecting castings and the consequent prevention of relative vertical shifting of the bodies A and B insures retention of the foot plate 52 in its proper position. The interengagement of said connecting castings 10 serves also to distribute excess load on one car to the other through the tongue and groove connections to the other body and then to the bolster and truck.

Buffing between the bodies A and B is taken care of by the pin 36, and pulling stresses between said bodies is through the transverse member E due to the extension of the projections 22 thereinto, and also through the segmental bearing connections of the bodies and bolsters.

It will be apparent from the above description that an articulation joint for railway vehicles has been provided which will permit the necessary turning of adjacent car bodies but which will prevent the separation of adjacent bodies in the event of failure of the segmental connections between the respective bodies and bolsters; the transverse member E serving to hold the car bodies together.

The drawings show one embodiment of the invention but it is to be understood that they are for illustrative purposes only and various changes in the form and proportions of the construction may be made within the spirit of the invention without departing from the scope of the appended claims.

What is claimed is:

1. In an articulated car, a truck comprising a plurality of bolsters, a transversely extending member intermediate the bolsters, a plurality of car bodies each provided with a depending member adapted to swivel in said transverse member, and interengaged segmental members carried respectively by the car bodis and truck for connecting said cars to the truck.

2. In an articulated car, a truck comprising a plurality of bolsters, a transversely extending member intermediate the bolsters, a plurality of car bodies each provided with a depending member adapted to swivel in said transverse member, and interengaging segmental members carried respectively by the car bodies and truck adapted to transmit pulling stresses from the bodies to the truck.

3. In an articulated car, a truck comprising a plurality of bolsters, a transversely extending member intermediate the bolsters, a plurality of car bodies each provided with a depending member extending into and adapted to swivel in said transverse member, said depending members being interengaged whereby to prevent excessive relative vertical shifting of the car bodies, and interengaging segmental bearings on said bodies and truck for supporting the bodies and for transmitting pulling stresses from the bodies to the truck.

4. In an articulated car, a truck comprising a plurality of bolsters, a transversely extending member intermediate the bolsters, a plurality of car bodies each provided with a depending member extending into and adapted to swivel in said transverse member, said depending members being interengaged whereby to prevent excessive relative vertical shifting of the bodies, and interengaging segmental bearings carried respectively by said bodies and bolsters for supporting the bodies and for transmitting pulling stresses from the bodies to the truck.

5. In an articulated car, a truck comprising a plurality of bolsters each having a segmental bearing, transoms intermediate the bolsters, a truck casting supported by the transoms, a pair of car bodies each having one end portion arranged over one of said bolsters, a connecting casting secured to each body and provided with a depending member at its forward end, said depending members extending into the truck casting and being adapted to swivel therein, and a segmental bearing depending from each of said connecting castings engaged with said bolster segmental bearings.

6. In an articulated car, a truck comprising spaced bolsters each having a segmental bearing thereon, a casting supported by the truck intermediate the bolsters, a plurality of car bodies, the end portions thereof being arranged respectively over the bolsters, segmental bearings depending from the bodies and engaged with the bolster segmental bearings, members depending from the adjacent end portions of said bodies extending into and adapted to swivel in said casting whereby to prevent relative lateral shifting of the car bodies, and a body spacer element intermediate the said depending members.

7. In an articulated car, a truck comprising spaced bolsters each having a segmental bearing thereon, a casting supported by the truck intermediate the bolsters, a plurality of car bodies, the end portions thereof being arranged respectively over the bolsters, segmental bearings depending from the bodies and engaged with the bolster segmental bearings, members depending from the adjacent end portions of said bodies extending into and adapted to swivel in said casting whereby to prevent relative lateral shifting of the car bodies, and a body spacer element intermediate the said depending members and supported by the truck.

8. In an articulated car, a truck comprising spaced bolsters each having a segmental bearing thereon, a casting supported by the truck intermediate the bolsters, a plurality of car bodies, the end portions thereof being arranged respectively over the bolsters, segmental bearings depending from the bodies and engaged with the bolster segmental bearings, members depending from the adjacent end portions of said bodies extending into and adapted to swivel in said casting whereby to prevent relative lateral shifting of the car bodies, and a body spacer element supported by the truck and arranged intermediate the said depending members for transmitting buffing shocks from one car body to the other.

9. In an articulated car, a body connecting casting comprising a body portion having a depending bearing member and a depending projection at its forward end.

10. In an articulated car, a body connecting casting comprising a body portion having a segmental bearing intermediate its ends and a depending projection at its forward end.

11. In an articulated car, a body connecting casting comprising a body portion having a segmental bearing intermediate its ends and a depending arcuate shaped projection at its front end.

12. In an articulated car, a body connecting casting comprising a body portion having a segmental bearing intermediate its ends and a depending arcuate shaped projection at its front end; the side edges of said projection being provided respectively with a tongue and a groove.

13. In an articulated car, a truck comprising spaced bolsters, a transversely extending member intermediate the bolsters, a plurality of car bodies having spaced members defining center sills, and castings secured to the ends of said bodies and resting upon the bolsters to support the car bodies, said castings having depending arcuate shaped projections at their forward ends extending into and adapted to swivel in the transverse member, and a buffing element intermediate said depending members.

14. In an articulated car, a truck comprising spaced bolsters, a transversely extending member intermediate the bolsters, a plurality of car bodies having spaced members defining center sills, and castings secured to the ends of said bodies and resting upon the bolsters to support the car bodies, said castings having depending arcuate shaped projections at their forward ends extending into and adapted to swivel in the transverse member, and a buffing element supported by the truck and arranged intermediate said depending members.

15. In an articulated car, a truck comprising a pair of bolsters and a transversely extending member intermediate said bolsters, a plurality of car bodies with the ends thereof arranged respectively over the bolsters, body connecting castings secured to the adjacent ends of said bodies and provided with depending projections adapted to swivel in said transversely extending member, said castings serving as supports for a foot plate.

16. In an articulated car, a truck, a plurality of car bodies having their adjacent end portions arranged over the truck, body connecting castings secured to the ends of said bodies and engaging the truck to support said bodies, a foot plate extending between the bodies, supporting brackets secured to the foot plate and resting upon the castings, and retaining elements secured to the castings and lapping the brackets for retaining the foot plate in position.

17. In an articulated car comprising a plurality of car bodies, a truck for carrying the adjacent end portions of two of said bodies, cooperating body and truck bearings connecting said bodies and truck, said body bearings forming parts of body center castings, projections formed with said body center castings, a casting supported by the truck and into which said projections extend, and spacing means interposed between the projections and supported by the truck for retaining said bodies in spaced relation and for preventing relative lateral shifting thereof.

18. In an articulated car comprising a plurality of car bodies, a truck for carrying the adjacent end portions of said bodies, said truck having a pair of bolsters, cooperating bearings on the bodies and bolsters for connecting the bodies and truck and for transmitting haulage stresses from the bodies to the truck, and a spacer loosely mounted between the adjacent end portions of the bodies and supported by the truck for maintaining the bodies in spaced relation and for preventing relative lateral shifting therebetween.

19. In an articulated car comprising a plurality of car bodies, a truck for carrying the adjacent end portions of said bodies, said truck having a pair of bolsters, cooperating bearings on the bodies and bolsters for connecting the bodies and truck, a spacer supported by the truck and arranged between the adjacent end portions of said bodies for maintaining the bodies in spaced relation and for preventing relative lateral shifting therebetween, and interengaging means formed with the adjacent end portions of said bodies for preventing relative vertical shifting of the car bodies.

20. In an articulated car, a pair of car bodies, a truck arranged beneath the adjacent end portions of said bodies and provided with a pair of spaced bolsters, a bearing member on each bolster, body connecting castings secured to the adjacent end portions of said car bodies and having bearing members adapted to engage the bearing members on said bolsters, and projections depending from the ends of the body connecting castings and engaged with a truck part to prevent separation of the car bodies in the event of failure of the before mentioned bearing connections.

21. In an articulated car, a pair of car bodies, a truck for supporting the adjacent end portions of the bodies, a pair of independent bolsters for the truck, body connection castings secured to the adjacent end portions of the bodies and having portions interengaged to prevent excessive relative vertical shifting of the bodies, and interengaged bearings on the bolsters and bodies for respectively supporting the bodies for horizontal swiveling movement.

22. In an articulated car, a pair of car bodies, a truck for supporting the adjacent end portions of the bodies, a pair of independent bolsters for the truck, body connection castings secured to the adjacent end portions of the bodies and having portions interengaged to prevent excessive relative vertical shifting of the bodies, interengaged bearings on the bolsters and bodies for respectively supporting the bodies for horizontal swiveling movement, and a body spacing element arranged between the adjacent end portions of the bodies and adapted to restrain the latter against excessive relative sidewise shifting.

23. An articulated car comprising a plurality of car bodies, a truck for supporting the adjacent end portions of said bodies, body connection castings secured to the adjacent end portions of the bodies and provided with bearing elements depending therefrom intermediate the ends of said castings and cooperating with the truck to connect the bodies and truck whereby to permit horizontal swiveling movement of said bodies and for transmitting haulage stresses from the bodies to the truck, said castings further having depending interengaged recessed projections at their forward ends, and a spacer element supported by the truck and loosely arranged between the said projections for taking buffing shocks and for restraining the bodies against excessive relative sidewise shifting.

24. In a railway vehicle, a truck having spaced bolsters and a plurality of transoms, a center casting carried by the transoms, a pair of car bodies having their adjacent end portions arranged respectively over the bolsters and supported by the latter for horizontal swiveling movement, said adjacent end portions of said bodies having parts thereof extended into the center casting, and car body spacing means interposed between the extended parts of the body end portions and supported by the center casting.

25. In an articulated car, a pair of car bodies, a truck beneath the adjacent end portions of said bodies and provided with a pair of spaced bolsters, body connection castings secured to the end portions of said bodies and each provided with a bearing element cooperating with one of the bolsters to connect the bodies and truck, and a foot plate supported by the castings and bridging the space between the adjacent end portions of the bodies.

26. A connection between the adjacent end portions of two bodies of an articulated car and a supporting truck comprising a pivot between said end portions, a pair of bolsters each arranged beneath one end portion of one of said bodies, and interengaged body and truck bearings between said end portions and bolsters adapted to permit horizontal swiveling movement of the bodies in a confined path, said pivot being the center of swiveling movement.

27. A connection between the adjacent end portions of two bodies of an articulated car and a supporting truck comprising a pivot between said end portions, a pair of bolsters each arranged beneath one end portion of one of said bodies, bearings between said end portions and bolsters adapted to permit horizontal rotation of the car end portions, said pivot being the center of rotation of said end portions, and interengaging projections on the car end portions for preventing excessive relative vertical shifting of said end portions.

28. A connection between the adjacent end portions of two bodies of an articulated car and a supporting truck comprising a pivot between said end portions, a pair of bolsters each arranged beneath one end portion of one of said bodies, bearings between said end portions and bolsters adapted to permit horizontal rotation of the car end portions, said pivot including projections depending from the end portions of said bodies extended into a truck part between said bolsters and said pivot being the center of rotation of the said end portions, said projections being so formed as to be interengaged to prevent excessive relative vertical shifting of the said end portions.

29. A connection between the adjacent end portions of two bodies of an articulated car and a supporting truck comprising a pivot between said end portions, a truck bolster arranged beneath the end portion of each body, bearings between the end portions and their respective bolsters adapted to permit horizontal rotation of said end portions, said pivot being the center of rotation and comprising a truck center casting and projections on the end portions of said car bodies extended into the truck center casting and cooperating therewith for transmitting pulling stresses from the bodies to the truck and for preventing excessive relative horizontal shifting of the car bodies.

30. A connection between the adjacent end portions of two bodies of an articulated car and a supporting truck comprising a pivot between said end portions, a truck bolster arranged beneath the end portion of each car body, bearings between the end portions and their respective bolsters adapted to permit horizontal rotation of said end portions, said pivot being the center of rotation and comprising a truck center casting arranged between said bolsters and projections on said car end portions extended into the truck center casting and cooperating therewith for transmitting pulling stresses from the bodies to the truck and for preventing excessive relative horizontal shifting of the car bodies.

31. A connection between the adjacent end portions of two bodies of an articulated car and a supporting truck comprising a pivot between said end portions, a truck bolster arranged beneath the end portion of each car body, bearings between the end portions and their respective bolsters adapted to permit horizontal rotation of said end portions, said pivot being the center of rotation and comprising a truck center casting arranged between said bolsters and projections on said car end portions extended into the truck center casting and cooperating therewith for transmitting pulling stresses from the bodies to the truck and for preventing excessive relative horizontal shifting of the car bodies, said projections being interengaged whereby to prevent excessive relative vertical shifting of the car bodies.

32. In an articulated car comprising a plurality of car bodies, a truck supporting the adjacent end portions of two of said bodies, a plurality of independently functioning truck bearings on the truck, a body bearing on each of said ends adapted to cooperate respectively with the truck bearings to permit horizontal swiveling movement between said bodies and truck, and a projection on one of said end portions engaging the other of said end portions to prevent excessive relative vertical shifting of the bodies.

33. A connection between the adjacent end portions of two bodies of an articulated car and a supporting truck comprising a pivot between said end portions, a truck bolster arranged beneath the end portion of each car body, bearings between the end portions and their respective bolsters adapted to permit horizontal rotation of said end portions, said pivot being the center of rotation and comprising a truck center casting arranged between said bolsters and projections on said car end portions extended into the truck center casting and cooperating therewith for transmitting pulling stresses from the bodies to the truck and from one body to the other and for preventing excessive relative horizontal shifting of the car bodies.

34. A connection between the adjacent end portions of an articulated car and a supporting truck comprising a pivot between said end portions, a truck bolster arranged beneath the end portion of each car body, bearings between the end portions and their respective bolsters adapted to permit horizontal rotation of said end portions, said pivot being the center of rotation and comprising a truck center casting arranged between said bolsters, a pivot pin positioned within the said casting, and projections on the end portions of said car bodies extended into said truck center casting adjacent said pivot pin.

35. A connection between the adjacent end portions of two bodies of an articulated car and a supporting truck comprising a pivot between said end portions, a truck bolster arranged beneath the end portion of each car body, bearings between the end portions and their respective bolsters adapted to permit horizontal rotation of said end portions, said pivot being the center of rotation and comprising a truck center casting arranged between said bolsters and projections on said car end portions extending into the truck center casting and cooperating therewith for transmitting pulling stresses from the bodies to the truck and from one body to the other and for preventing excessive relative horizontal shifting of the car bodies, and a body spacing element supported by said casting and arranged between said projections at substantially the pivotal axis.

36. In an articulated car, a truck comprising a plurality of bolsters, a transversely extending member intermediate the bolster, a plurality of car bodies each provided with a depending member arranged for swiveling movement in said transverse member, and a body spacing element supported by said transverse member between said depending members at the pivotal axis.

In witness whereof we have hereunto set our hands.

ALLEN W. CLARKE.
WILLIAM GRIFFIN.